(12) United States Patent
Barse

(10) Patent No.: US 9,381,442 B2
(45) Date of Patent: Jul. 5, 2016

(54) VARIABLE-TRACK ROLLING TOY

(71) Applicant: PARROT, Paris (FR)

(72) Inventor: Thomas Barse, Aichi (JP)

(73) Assignee: PARROT, Paris (FR)

( * ) Notice: Subject to any disclaimer, the term of this patent is extended or adjusted under 35 U.S.C. 154(b) by 0 days.

(21) Appl. No.: 14/514,230

(22) Filed: Oct. 14, 2014

(65) Prior Publication Data

US 2015/0111462 A1 Apr. 23, 2015

(30) Foreign Application Priority Data

Oct. 18, 2013 (FR) ...................................... 13 60149

(51) Int. Cl.
| | |
|---|---|
| *A63H 17/26* | (2006.01) |
| *B60B 1/14* | (2006.01) |
| *B60B 3/00* | (2006.01) |
| *B60B 9/04* | (2006.01) |
| *B60B 9/26* | (2006.01) |
| *B60B 35/10* | (2006.01) |
| *A63H 18/00* | (2006.01) |

(52) U.S. Cl.
CPC .............. *A63H 17/262* (2013.01); *A63H 18/00* (2013.01); *B60B 1/14* (2013.01); *B60B 3/001* (2013.01); *B60B 3/005* (2013.01); *B60B 3/007* (2013.01); *B60B 9/04* (2013.01); *B60B 9/26* (2013.01); *B60B 35/1009* (2013.01)

(58) Field of Classification Search
CPC .................................................... A63H 17/262
See application file for complete search history.

(56) References Cited

U.S. PATENT DOCUMENTS

| | | | |
|---|---|---|---|
| 4,648,853 A | 3/1987 | Siegfried | |
| 5,487,692 A | 1/1996 | Mowrer et al. | |
| 6,217,408 B1 * | 4/2001 | Willinger | A01K 15/025 |
| | | | 119/707 |
| 7,056,185 B1 | 6/2006 | Anagnostou | |
| 2008/0261487 A1 | 10/2008 | Torres | |
| 2011/0014849 A1 * | 1/2011 | Sip | A63H 17/262 |
| | | | 446/457 |

FOREIGN PATENT DOCUMENTS

| | | |
|---|---|---|
| GB | 111408 A | 11/1917 |
| JP | 2011041696 A | 3/2011 |
| WO | 2006029416 A2 | 3/2006 |

* cited by examiner

*Primary Examiner* — Michael Dennis
(74) *Attorney, Agent, or Firm* — Haverstock & Owens LLP

(57) ABSTRACT

The present invention relates to a toy comprising at least two parallel wheels each comprising a hub (14), a rim (16) provided with a tread (18), and a plurality of spokes (20) made of an elastically deformable material. The unit formed by the hub and the spokes is mounted into the rim under compressive stress on the spokes, so as to produce, by buckling effect, a bending of the spokes curving these latter and offsetting axially the plane of the hub with respect to that of the rim. The unit can hence take two stable positions in the direction of bending of the spokes, i.e. an extended position with an enlarged track and a retracted position with a reduced track. It is just needed to apply an external mechanical effort on the rim, in one direction or the other, to reverse the direction of bending of the spokes, and thus to switch from the extended position to the retracted position, or vice versa.

8 Claims, 3 Drawing Sheets

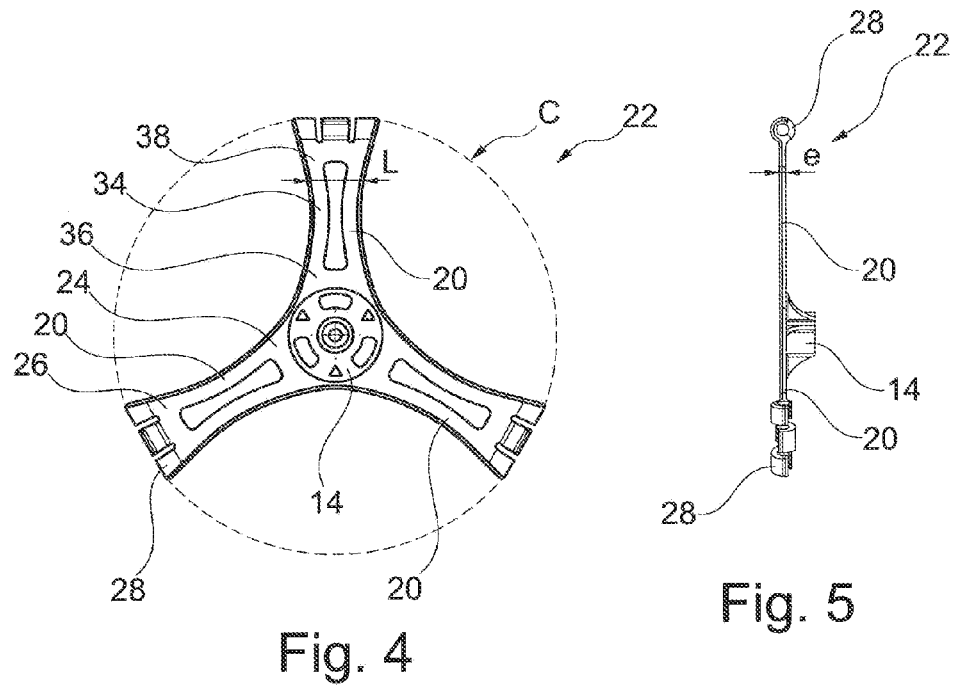
Fig. 4
Fig. 5
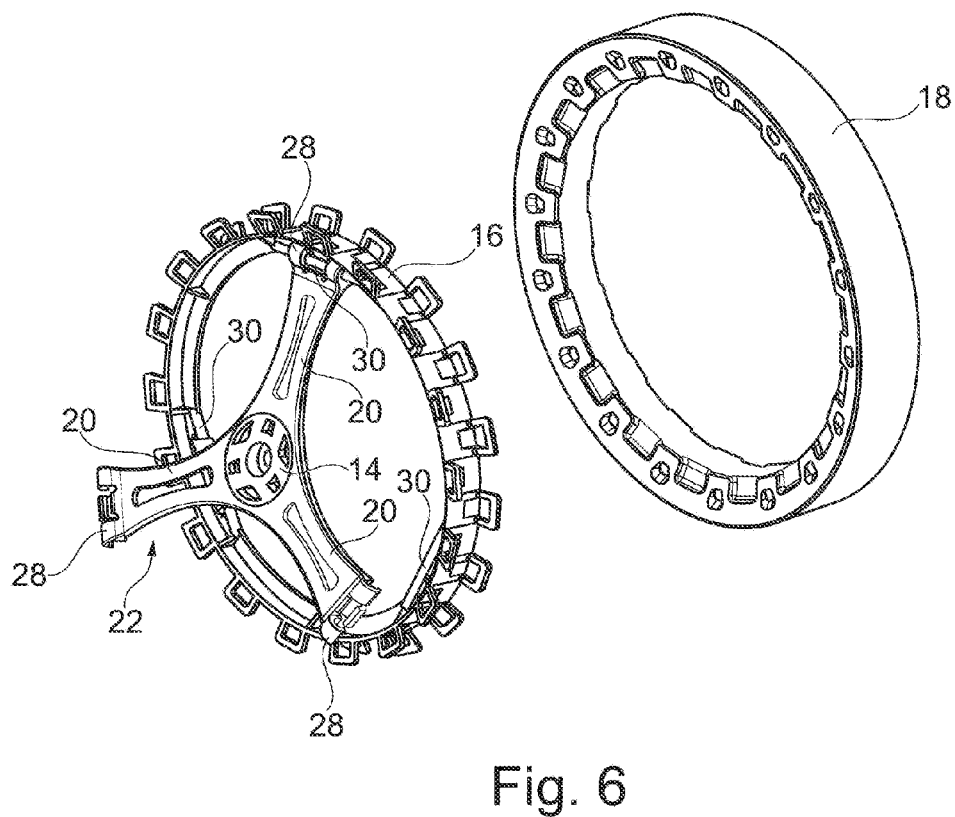
Fig. 6

VARIABLE-TRACK ROLLING TOY

FIELD OF THE INVENTION

The invention relates to a rolling toy including at least one pair of parallel wheels arranged on either side of a body of the toy.

BACKGROUND OF THE INVENTION

Such a type of toy is disclosed for example in JP 2011/41696 A (Barse), which describes a remote-controlled rolling and jumping toy mounted on two independent wheels each driven by an individual motor, which allows the toy to move forward, to move rearward, to rotate, to take a jumping position, etc. by the single action of its two wheels.

SUMMARY OF THE INVENTION

The invention is however not limited to this type of toy and can also be applied to other rolling toy configurations, for example toys including several pairs of wheels (such as a four-wheel car), or a toy whose wheels are connected to a common shaft and/or whose wheels may be both driving or free wheels.

FR 336 551 A, WO 2006/029416 A2, GB 111 408 A and FR 798 537 A describe various wheel configurations, applicable to toys.

The toy size and the configuration of its wheels must fulfill very varied demands, and according to the case the user may search for a reduced bulk (for example to be able to play in confined spaces or to circulate in the middle of obstacles close to each other) or a high stability (for example for fast displacements on an uneven ground, or for a better jump control in the case of a jumping toy).

These compactness and stability requirements highly depend on the track, i.e. the mutual spacing between the two wheels in the transverse direction: a small track will allow to have a compact toy but to the detriment of the stability, in particular if the centre of gravity of toy is rather high; on the other hand, a wide track will provide an excellent stability, but to the detriment of the whole bulk of the toy and the maneuverability thereof.

The object of the invention is to free from this compromise, by proposing a toy whose transverse wheel spacing can be very simply modified by the user between two positions, corresponding to a minimum bulk and to a maximum stability, respectively.

It will be seen, moreover, that the solution of the invention can be implemented with a minimum of material means, without multiplication of mechanical parts, and hence with a very low cost and an extreme simplicity from the technological point of view, as well as a very high robustness to use.

The invention proposes for that purpose a rolling toy comprising, in a manner known per se, for example from above-mentioned FR 336 551 A, at least one pair of parallel wheels arranged on either side of a body of the toy, these wheels defining between each other a track in the axial direction. Each wheel comprises a hub, a rim provided with a tread, and a plurality of spokes extending from the hub to an inner region of the rim. The spokes are elastically deformable and the unit formed by the hub and the spokes is mounted into the rim, under compressive stress on the spokes, so as to produce, by buckling effect, a bending of the spokes curving these latter and offsetting axially the plane of the hub with respect to that of the rim.

According to the invention, this unit is adapted to take two different, equally stable positions according to the direction of bending of the spokes, i.e. an extended position with an enlarged track, where the plane of the rim is located remote from the plane of the hub, in the axial direction with respect to the toy body, and a retracted position with a reduced track, where the plane of the rim is located close to the plane of the hub, in the axial direction with respect to the toy body. The shape and the elasticity of the spoke material are chosen so as to allow a reversal of the direction of bending of the spokes, and correlatively the switching from the extended position to the retracted position, or vice versa, under the effect of an external mechanical effort applied in the axial direction to the rim, in one direction or the other, respectively.

According to various advantageous subsidiary characteristics:

- the hub and the spokes are made as a unique integral connecting part, distinct from the rim and adapted to be mounted on the latter, in particular as a part that is flat at rest before fastening to the rim, and the overall circumferential size of this connecting part is greater than the diameter of the inner region of the rim, so as to force the bending of the spokes during the mounting of the connecting part into the rim;
- each spoke forms a structure of the fixed/ball-and-socket articulated beam type, comprising a rigid connection of the proximal portion of the spoke to the hub, and a punctual connexion of the distal portion of the spoke to the inner region of the rim, this connection having at least one pivoting degree of freedom about an axis oriented tangentially with respect to the rim;
- clipsable means for connecting the distal portion of the spoke to the inner region of the rim are provided, in particular means comprising at least one deformable clamp and one cooperating rod extending following a cord of the inner periphery of the rim, the deformable clamp being carried by the radial end of the spoke and the cooperating rod being carried by the rim, or vice versa;
- the spokes comprise a flattened central region, with a width dimension in a radial plane lower than their thickness dimension in the axial direction. This flattened central region may have a smaller width dimension in the median portion than in the end portions.

BRIEF DESCRIPTION OF THE DRAWINGS

An exemplary embodiment of the device of the invention will now be described, with reference to the appended drawings in which the same references denote identical or functionally similar elements throughout the figures.

FIGS. 4 and 5 show in isolation, in front view and side view, respectively, a hub-spokes unit of the wheel according to the invention.

FIG. 6 is an exploded, full view of the wheel according to the invention, illustrating the way to insert the hub-spokes unit of FIGS. 4 and 5 into the wheel rim, the latter being then provided with its tread.

DETAILED DESCRIPTION OF THE INVENTION

Figure 1A:
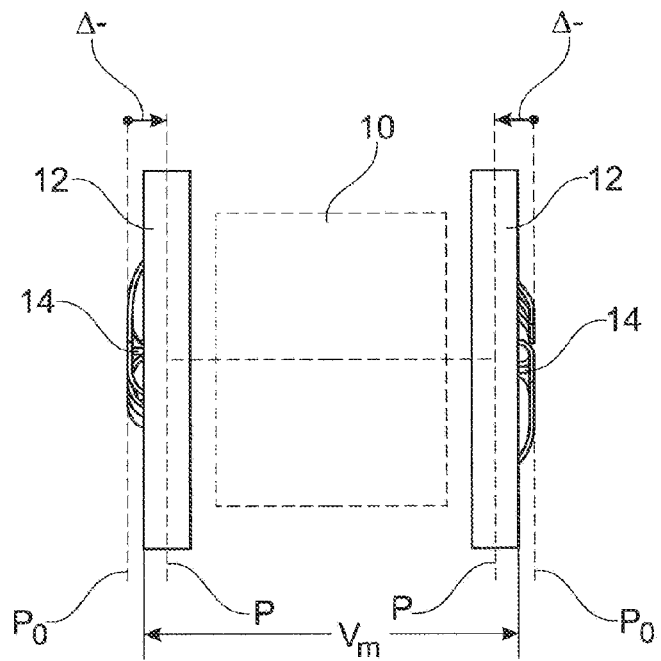
FIGS. 1a and 1b are front views of the toy according to the invention, showing the two retracted and extended positions, respectively, of the wheels mounted on either side of the toy body.
Figure 1B:
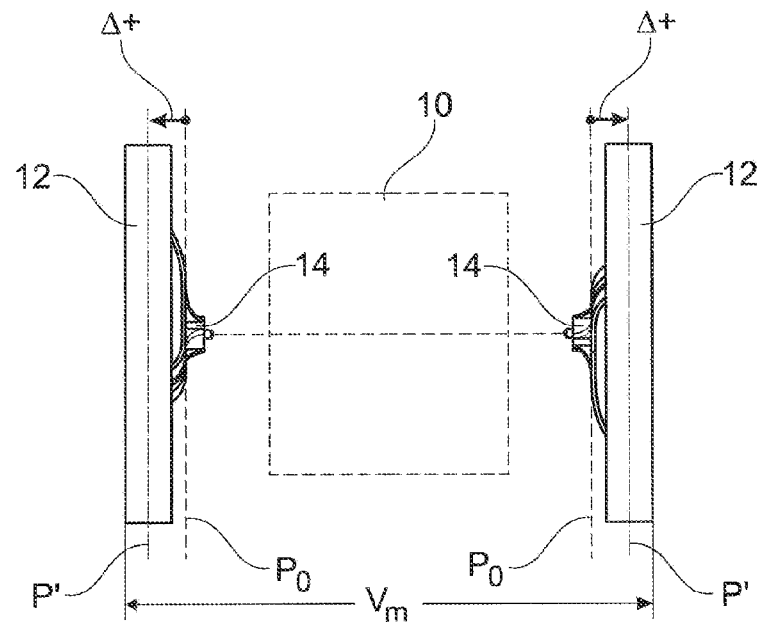
Figure 2A:
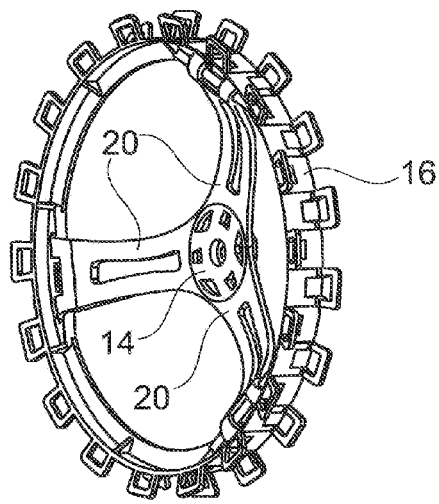
FIGS. 2a and 2b show in isolation, in perspective view, the wheel of the toy of the invention, in the extended and retracted positions, respectively.
Figure 3A:
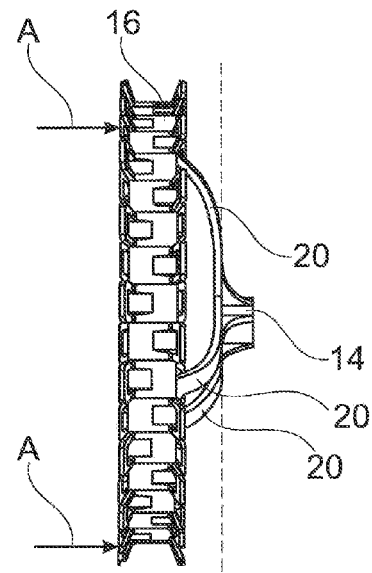
FIGS. 3a and 3b are similar to FIGS. 2a and 2b, in side view.
Figure 2B:
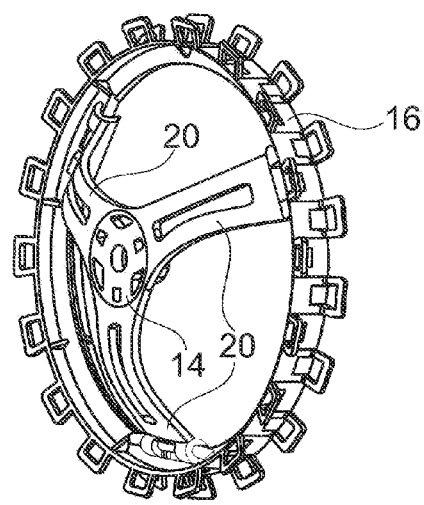
Figure 3B:
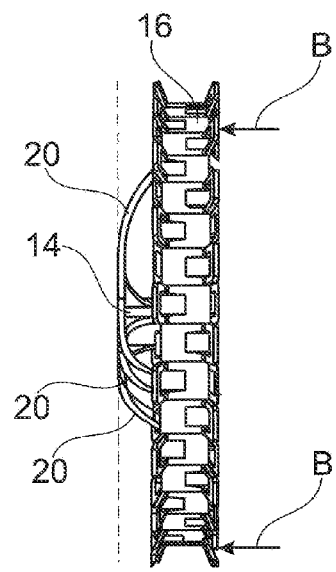

In FIGS. 1a and 1b, the reference 10 denotes in a general and schematic manner the toy body, which is provided with at least one pair of lateral wheels 12 each having a central hub 14 connected to the body 10 by suitable means (not shown), such as a shaft connected to a driving motor of the wheel, a common axle connected or not to a motor, etc.

The wheels are mounted on the body 10 in such a manner that the hubs 14 are located in a radial plane $P_0$ whose position is fixed with respect to the body 10, i.e. the two planes $P_0$ corresponding to the respective hubs of the two wheels will have a fixed mutual spacing.

On the other hand, the wheel rims will be able to be displaced between two positions, schematically shown in FIGS. 1a and 1b:

- in a first position illustrated in FIG. 1a, hereinafter "retracted position", the respective planes P of the wheels 12 will be closer to the toy body 10 than the planes $P_0$ of the hubs 14 (offset $\Delta^-$ in the figure) providing the toy with a minimal track $V_m$;
- in a second position illustrated in FIG. 1b, hereinafter "extended position", the wheels will be, on the other hand, in radial planes P' that are further from the toy body 10 than the planes $P_0$ of the hubs 14 (offset $\Delta^+$ in the figure), hence providing the toy with a maximum track $V_m$ offering a greater stability than the retracted position (but at the cost of a lesser compactness).

The structure of each of the wheels 12 equipping the toy will now be described, with reference to FIGS. 2 to 6.

These wheels are made about a hub 14 from which extend a plurality of spoke 20 allowing to connect this hub to a circular rim 16 receiving, as illustrated in FIG. 6, a tread 18 of the solid tyre or pneumatic tyre type. These different elements are made of suitable plastic materials, for example polypropylene for the hub and the spokes 20, ABS for the rim 16 and a low-density polyolefin foam for the tread 18.

As regards the spokes 20, these latter are for example three in number, all identical, and extend radially outward from the hub 14 to an inner peripheral region of the rim 16, to which they are connected as will be explained in detail hereinafter.

FIGS. 4 and 5 illustrate more precisely the structure of the hub 14 and of the spokes 20, which are advantageously made as a unique integral connecting part 22. In FIGS. 4 and 5, this part has been shown in isolation, as it is at rest, in the absence of any external stress or force, i.e. before being mounted into the rim 16 (this mounting being made under stress).

In this free state, the part 22 has a flat shape, the spokes 20 extending rectilinearly, with no curvature (cf. FIG. 5) from a proximal portion 24, where they are connected to a flange portion of the hub 14, to a distal portion 26, where they are connected to an inner peripheral region of the rim 16. At the proximal portion 24, the spoke 20 is formed integral with the hub 14 which, from the structural mechanics point of view, may be considered as a fixed connexion.

At the distal end 26 of the spoke, the connection to the rim is advantageously an articulated connexion, having at least one pivoting degree of freedom. This degree of freedom is obtained by shaping the distal end of the spoke 26 as a clamp 28 that is clipsable on a corresponding rod 30 formed on the inside of the rim, along a cord (FIG. 6).

From the structural mechanics point of view, this connection may be defined as a ball-and-socket connection so that, to describe the bending behaviour of the spoke 20, the latter can be liken to a fixed/ball-and-socket articulated beam.

Moreover, this articulated connection allows to avoid the warping of the rim 16 under the effect of the stresses applied by the connecting part 22 when the latter is connected to the rim.

Indeed, as illustrated in FIG. 4, the integral connecting part has an overall circumferential size C whose diameter is higher than that of the inner periphery of the rim 16. Therefore, if at rest the connecting part 22 is flat, at the time of its mounting on the rim 16, it will be required to curve it so that the three clamps 28 can engage with the three rods 30. The rim 16 being far more rigid than the spokes, this bending stress will be essentially transferred to the three spokes 20, which will then take the shape illustrated in FIGS. 2a to 3b due to the buckling effect resulting from the compression stress applied to each spoke 20 between its proximal region 24 (fixed) to the hub and its distal region (articulated) 26 coupled to the rim.

The fixed/ball-and-socket articulated structure causes the spoke to have, at the equilibrium, a continuous curvature, with possibility to turn the concavity either towards one side (FIGS. 2a and 3a) or the other side (FIGS. 2b and 3b) by a simple external mechanical action by the user (arrows A or B, respectively, in FIGS. 3a and 3b), by pressing of the rim.

The wheel can hence be deformed between two different fixed and stable positions, due simply to the bending elasticity of the spokes 20 and to the possibility to produce with them a buckling effect in one direction or the other.

The flexibility of the spokes, which determines this effect, may be increased by providing them with a flattened shape, with a low (and constant) thickness e very lower than the width L in transverse direction (FIGS. 4 and 5).

The flexibility can also be modified by providing for the spoke a thinner central portion 34 in the width dimension L, with respect to the end portions 36, 38, which will be wider at the place of connection to the hub and to the rim, respectively, where more important stresses may be exerted, in particular during the use of the toy in periods of rolling, reaction to a jump or a fall, etc. Moreover, this particular shape, allows, in addition to its advantageous aspect, to reduce the mass of the wheel.

The invention claimed is:

1. A rolling toy comprising at least one pair of parallel wheels (12) arranged on either side of a body (10) of the toy, said wheels having a mutual spacing between them, defining a track in an axial direction, each wheel comprising:
   a hub (14);
   a rim (16) provided with a tread (18); and
   a plurality of spokes (20) extending from the hub to an inner region of the rim,
wherein the spokes are elastically deformable and
wherein a unit formed by the hub and the spokes is mounted into the rim, under compressive stress on the spokes, so as to produce, by buckling effect, a bending of the spokes offsetting axially a plane of the hub with respect to that of the rim, characterized in that:
   the unit formed by the hub and the spokes is adapted to take two different, equally stable positions according to a direction of bending of the spokes, comprising:
      an extended position with an enlarged track ($V_M$), where the plane of the rim (P') is located remote ($\Delta^+$) from the plane of the hub ($P_0$) in the axial direction with respect to the toy body, and
      a retracted position with a reduced track ($V_m$), where the plane of the rim (P) is located close ($\Delta^-$) to the plane of the hub ($P_0$) in the axial direction with respect to the toy body; and
   the shape and the elasticity of the spoke material are chosen so as to allow a reversal of the direction of bending of the spokes, and correlatively the switching from the extended position to the retracted position, or vice versa, under the effect of an external mechanical effort applied in the axial direction to the rim, in one direction (A) or the other (B), respectively.

2. The rolling toy of claim 1, wherein the hub (14) and the spokes (20) are made as a unique integral connecting part (22), distinct from the rim and adapted to be mounted on the rim.

3. The rolling toy of claim 2, wherein the connecting part (22) is a part that is flat at rest before fastening to the rim, and an overall circumferential size (C) of this connecting part is greater than the diameter of the inner region of the rim, so as to force the bending of the spokes during the mounting of the connecting part into the rim.

4. The rolling toy of claim 1, wherein each spoke forms a structure of a fixed/ball-and-socket articulated beam type, comprising:
 a rigid connection of the proximal portion (24) of the spoke to the hub, and
 a punctual connection of the distal portion (26) of the spoke to an inner region of the rim, this connection having at least one pivoting degree of freedom about an axis oriented tangentially with respect to the rim.

5. The rolling toy of claim 1, comprising clippable means (28, 30) for connecting a distal portion of the spoke to an inner region of the rim.

6. The rolling toy of claim 5, wherein the clippable means comprise at least one deformable clamp (28) and one cooperating rod (30) extending following a cord of an inner periphery of the rim, the deformable clamp being carried by a radial end of the spoke and the cooperating rod being carried by the rim, or vice versa.

7. The rolling toy of claim 1, wherein the spokes comprise a flattened central region, with a width dimension (L) in a radial plane lower than their thickness dimension (e) in an axial direction.

8. The rolling toy of claim 7, wherein the width dimension (L) of the flattened central region is smaller in an median portion (34) than in end portions (36, 28) thereof.

\* \* \* \* \*